March 2, 1965 J. A. PETRIE ETAL 3,171,522
PLATE CLUTCH
Filed Dec. 1, 1961

Inventors
James Alexander Petrie
Kenneth Edward Bracy
By Cushman, Darby & Cushman
Attorneys 3,171,522
PLATE CLUTCH
James Alexander Petrie, Littleover, and Kenneth Edward Bracey, Findern, England, assignors to Rolls-Royce Limited, Derby, England, a company of Great Britain
Filed Dec. 1, 1961, Ser. No. 156,454
Claims priority, application Great Britain, Dec. 16, 1960, 43,479/60
9 Claims. (Cl. 192—69)

This invention concerns plate clutches.

According to the present invention, there is provided a plate clutch comprising a rotatable driving member, a rotatable driven member, at least one clutch plate carried by each of said members, means for bringing the clutch plates of the driving and driven members into driving engagement with each other, and at least one annular spring plate which urges said clutch plates out of driving engagement with each other.

Thus whenever the clutch is inoperative, that is to say whenever the clutch plates are not brought into driving contact with each other, the spring plate urges the clutch plates apart so as to prevent rubbing therebetween.

Preferably the annular spring plate is rotated on rotation of said driving member, hoop stresses developed within the spring plate on such rotation serving to urge the clutch plates out of driving engagement with each other.

Preferably there are means operative upon the clutch plates being moved into engagement with each other, for reducing the outside diameter of the spring plate.

The spring plate is preferably of undulating form. Thus the means for reducing the outside diameter of the spring plate may comprise means, operative upon the clutch plates being moved into engagement with each other, for increasing the depth of the undulations in the spring plate. The means for increasing the depth of the undulations may comprise angularly spaced apart abutment members which extend axially of adjacent clutch plates and which engage opposite sides of the spring plate.

Preferably the driving and driven members are concentric and each has a plurality of clutch plates which are interleaved with those of the other member. An annular spring plate is preferably provided between each pair of adjacent clutch plates of the driving member and between each pair of adjacent clutch plates of the driven member.

Figure 1:
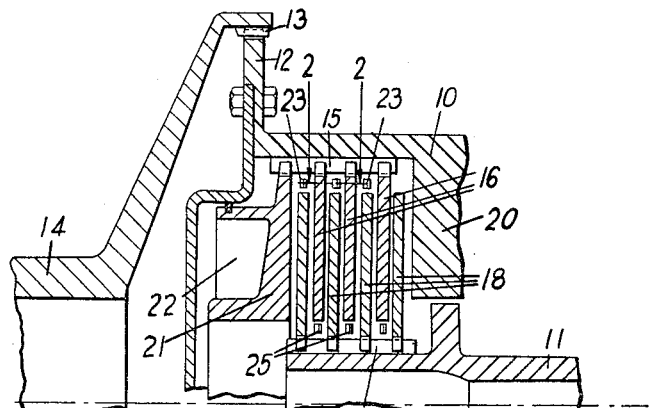
Figure 2:
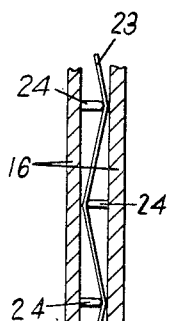
Figure 3:
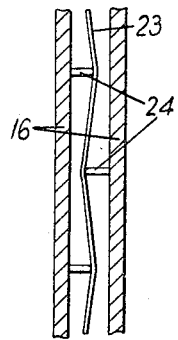
Figure 4:
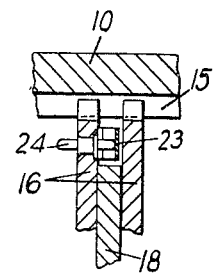
Figure 5:
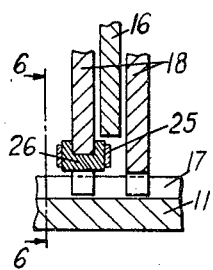
Figure 6:
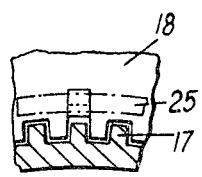

The invention is illustrated merely by way of example in the accompanying drawings, in which:

FIGURE 1 is a broken away sectional view of a plate clutch according to the present invention, FIGURE 2 is a section taken on the line 2—2 of FIGURE 1, FIGURE 3 is a view similar to FIGURE 2 but showing the parts thereof in different positions, FIGURE 4 is a section showing part of the structure of FIGURE 1 on an enlarged scale and with the parts thereof in different positions, FIGURE 5 is a section showing another part of the structure of FIGURE 1 on an enlarged scale, and FIGURE 6 is a section taken on the line 6—6 of FIGURE 5.

Referring to the drawings, a plate clutch comprises a driving member which is constituted by a rotatable casing 10 and a driven member which is constituted by a shaft 11, the shaft 11 being concentric with the casing 10.

The casing 10 has a radially extending flange 12 which is connected by a series of splines or dogs 13 to a shaft 14. The shaft 14 is driven, by means not shown.

The casing 10 is provided with internal axially-extending splines 15 on which are mounted a plurality of annular clutch plates 16 through whose central openings extends the shaft 11. The latter is provided with external axially-extending splines 17 on which are mounted annular clutch plates 18 which are interleaved with the clutch plates 16.

The clutch plates 16, 18 are disposed between a flange 20 of the casing 10 and a movable thrust plate 21 which is splined onto the casing 10 for movement axially thereof. The thrust plate 21 is formed with a chamber 22.

A supply of pressure fluid may be admitted (by means not shown) to the chamber 22 and may be withdrawn therefrom. When the pressure fluid is so admitted, the thrust plate 21 forces the clutch plates 16, 18 into driving engagement with each other whereby the shaft 11 may be driven from the casing 10.

Between each adjacent pair of clutch plates 16, and between the thrust plate 21 and the clutch plate 16 adjacent thereto, there is provided an annular spring plate 23. Each spring plate 23 is of undulating form and is spaced outwardly of, but is radially aligned with, a clutch plate 18. The thrust plate 21 and each of the clutch plates 16 is provided with angularly spaced apart pins 24 which engage opposite sides of the spring plates 23 at the "crests" of the undulations thereof.

Between each adjacent pair of clutch plates 18 there is provided an annular spring plate 25. Each spring plate 25, which may be of undulating form like that of the spring plate 23, is disposed inwardly of and is radially aligned with a clutch plate 16. Each clutch plate 18 carries a plurality of angularly space apart abutment blocks 26 which engage the spring plates 25.

When the clutch is inoperative, that is to say when no drive can be transmitted from the casing 10 to the shaft 11, the parts are disposed as shown in FIGURES 1, 3 and 5. In the said inoperative position, no pressure fluid is admitted to the chamber 22 and the clutch plates 16, 18 are not therefore forced into driving engagement with each other. Rotation of the casing 10 will not, however cause rubbing between the clutch plates 16, 18 since the spring plates 23, 25 will urge the clutch plates 16, 18 apart.

Moreover, since the spring plates 23 will be rotated whenever the casing 10 is rotated, such rotation will produce hoop stresses in the spring plates 23. These hoop stresses, however, will tend to stretch the spring plates 23 radially outwardly and will therefore increase the force urging the clutch plates 16 apart.

When it is required to bring the clutch into operation, pressure fluid is admitted to the chamber 22 and the parts will be forced into the position shown in FIGURES 2 and 4. In this position, the clutch plates 16, 18 are in driving engagement and the pins 24 cause the undulations in the spring plates 23 to increase in depth. This causes the outside diameter of the spring plates 23 to become reduced whereby they are prevented from jamming against the splines 15.

It will be noted that the spring plates 23, 25 are not connected to the casing 10 by means such that friction forces would be introduced which would impair the function of the discs.

We claim:

1. A plate clutch comprising a rotatable driving member, a rotatable driven member, at least one clutch plate carried by each of said members, means for bringing the clutch plates of the driving and driven members into driving engagement with each other, at least one annular spring plate which when relaxed has an undulating form and which urges said clutch plates out of driving engagement with each other, and which is rotated on rotation of said driving member, said spring plate having hoop stresses developed therein on such rotation which urge the clutch plates out of driving engagement with each other, and angularly spaced apart abutment members which extend axially of adjacent clutch plates and which engage opposite sides of the spring plate, said abutment members being operative upon the clutch plates being moved into engagement with each other, to increase the depth of the undulations in the spring plate, whereby to reduce the outside diameter of the spring plate.

2. A plate clutch comprising a rotatable driving member, a rotatable driven member, at least one clutch plate carried by each of said members, means for bringing the clutch plates of the driving and driven members into driving engagement with each other, at least one annular spring plate which when relaxed has an undulating form and which urges said clutch plates out of driving engagement with each other, and angularly spaced apart abutment members which extend axially of adjacent clutch plates and which engage opposite sides of the spring plate, said abutment members being operative, upon the clutch plates being moved into engagement with each other, to increase the depth of the undulations in the spring plate, whereby to reduce the outside diameter of the spring plate.

3. A plate clutch as claimed in claim 2 in which the driving and driven members are concentric and each has a plurality of clutch plates interleaved with the clutch plates of the other member.

4. A plate clutch as claimed in claim 3 in which an annular spring plate is provided between each pair of adjacent clutch plates of the driving member and between each pair of adjacent clutch plates of the driven member.

5. A plate clutch comprising a driving member and a driven member both rotatable about a common axis, at least two clutch plates carried by one of said members, at least one clutch plate carried by the other of said members and disposed between said two clutch plates for engagement therewith, an annular undulated spring plate disposed between said two clutch plates, engagement means carried by said two clutch plates and engaging said spring plate such that movement of said two clutch plates towards one another forces the spring plate into an increasingly undulating form, said spring plate urging said two clutch plates apart, and being adapted to move said two clutch plates out of engagement with said one clutch plate, and means selectively operable to overcome the force of said spring plate and urge said two clutch plates into engagement with said one clutch plate.

6. A plate clutch comprising a driving member and a driven member both rotatable about a common axis, at least two clutch plates carried by one of said members and at least one clutch plate carried by the other of said members and disposed between said two clutch plates for engagement therewith, an annular undulated spring plate disposed between said two clutch plates and lying substantially in the plane of said one clutch plate disposed between the said two clutch plates and radially spaced from the same, angularly spaced apart abutment members on and projecting from the radial faces of each of said two clutch plates for engaging opposite sides of said undulated spring plate, and means selectively operable to move said two clutch plates into engagement with said one clutch plate against the force of said undulated spring plate.

7. A plate clutch as claimed in claim 6 in which said two clutch plates are carried by said driving member and in which said abutment members engage and cause said undulated spring plate to rotate with said two clutch plates while said two clutch plates are out of engagement with said one clutch plate.

8. A plate clutch comprising a driving member and a driven member both rotatable about a common axis, at least two clutch plates carried by each of said members, the clutch plates of one member interleaving the clutch plates of the other member, each adjacent pair of clutch plates of the driving member and each adjacent pair of clutch plates of the driven member having a respective annular undulated spring plate disposed therebetween and normally urging them apart so that the clutch plates of the driving member are out of engagement with the clutch plates of the driven member, angularly spaced apart abutment members on and projecting from the radial faces of the adjacent pair of clutch plates of the driving member for engaging opposite sides of the annular spring plate disposed therebetween and angularly spaced apart abutment members on and projecting from the radial faces of the adjacent pair of clutch plates of the driven member for engaging opposite sides of the annular spring plate therebetween, said abutment members on the adjacent pair of clutch plates of the driving member causing the spring plate therebetween to rotate when the driving member is rotating and the clutch plates are out of engagement with the clutch plates of the driven member, and means selectively operable to move the clutch plates of said driving and driven member into engagement against the force of said undulated spring plates.

9. A plate clutch as claimed in claim 8 wherein the annular spring plate disposed between the adjacent pair of clutch plates of the driving member is disposed radially outwardly of one of the clutch plates of the driven member and wherein the annular spring plate disposed between adjacent pairs of clutch plates of the driven member is disposed radially inwardly of one of the clutch plates of the driving member.

References Cited by the Examiner

UNITED STATES PATENTS

| 1,872,250 | 8/32 | Coughtry | 192—69 |
| 2,217,357 | 10/40 | Coe | 192—69 |

FOREIGN PATENTS

| 11,723 | 3/03 | Great Britain. |
| 204,425 | 11/08 | Germany. |

DAVID J. WILLIAMOWSKY, *Primary Examiner.*

THOMAS J. HICKEY, *Examiner.*